(12) United States Patent
Luce

(10) Patent No.: US 6,912,897 B2
(45) Date of Patent: Jul. 5, 2005

(54) DEVICE FOR MOUNTING A DETECTOR ON A WHEEL RIM AND CORRESPONDING PROCESS

(75) Inventor: Dominique Luce, Toulouse (FR)

(73) Assignee: Siemens VDO Automotive, Toulouse Cedex (FR)

( * ) Notice: Subject to any disclaimer, the term of this patent is extended or adjusted under 35 U.S.C. 154(b) by 201 days.

(21) Appl. No.: 10/328,043

(22) Filed: Dec. 26, 2002

(65) Prior Publication Data

US 2003/0121317 A1 Jul. 3, 2003

(30) Foreign Application Priority Data

Dec. 28, 2001 (FR) ............................................ 01 16986

(51) Int. Cl.⁷ .............................................. B60C 23/00
(52) U.S. Cl. ...................... 73/146.8; 73/146.3; 340/442
(58) Field of Search ................................ 137/223, 227; 73/146, 146.3, 146.8; 340/442

(56) References Cited

U.S. PATENT DOCUMENTS

| | | | | |
|---|---|---|---|---|
| 5,844,131 A | * | 12/1998 | Gabelmann et al. ....... | 73/146.8 |
| 5,956,820 A | * | 9/1999 | Albinski .................... | 340/442 |
| 6,055,855 A | | 5/2000 | Straub | |
| 6,160,474 A | * | 12/2000 | Tsunetomi et al. .......... | 340/442 |
| 6,163,255 A | * | 12/2000 | Banzhof et al. ........... | 73/146.8 |
| 6,557,405 B2 | * | 5/2003 | Shimura et al. .............. | 73/146 |
| 6,557,406 B2 | * | 5/2003 | Gabelmann ................ | 73/146.5 |
| 6,568,259 B2 | * | 5/2003 | Saheki et al. .............. | 73/146.8 |
| 6,591,672 B2 | * | 7/2003 | Chuang et al. ............ | 73/146.8 |
| 2002/0046599 A1 | * | 4/2002 | Chuang et al. ............... | 73/146 |
| 2003/0066343 A1 | * | 4/2003 | Fischer et al. ................ | 73/146 |

FOREIGN PATENT DOCUMENTS

DE   200 15 295   4/2001

* cited by examiner

*Primary Examiner*—John Rivell
(74) *Attorney, Agent, or Firm*—Young & Thompson

(57) ABSTRACT

A detector is mounted on a wheel rim of an automotive vehicle. The provided device comprises a housing receiving the detector, a traction member having an axis, the traction member being adapted to be mounted on the rim, to pull the housing toward this rim along its axis, the housing being articulated relative to this traction member, elements for blocking the traction member relative to the rim, once the housing has been drawn toward the rim, and a sealing joint surrounding the traction member in the region in which it passes through the rim. The housing has a convex bearing surface to bear toward the joint substantially along the axis of the traction member.

12 Claims, 1 Drawing Sheet

DEVICE FOR MOUNTING A DETECTOR ON A WHEEL RIM AND CORRESPONDING PROCESS

Figure 1:
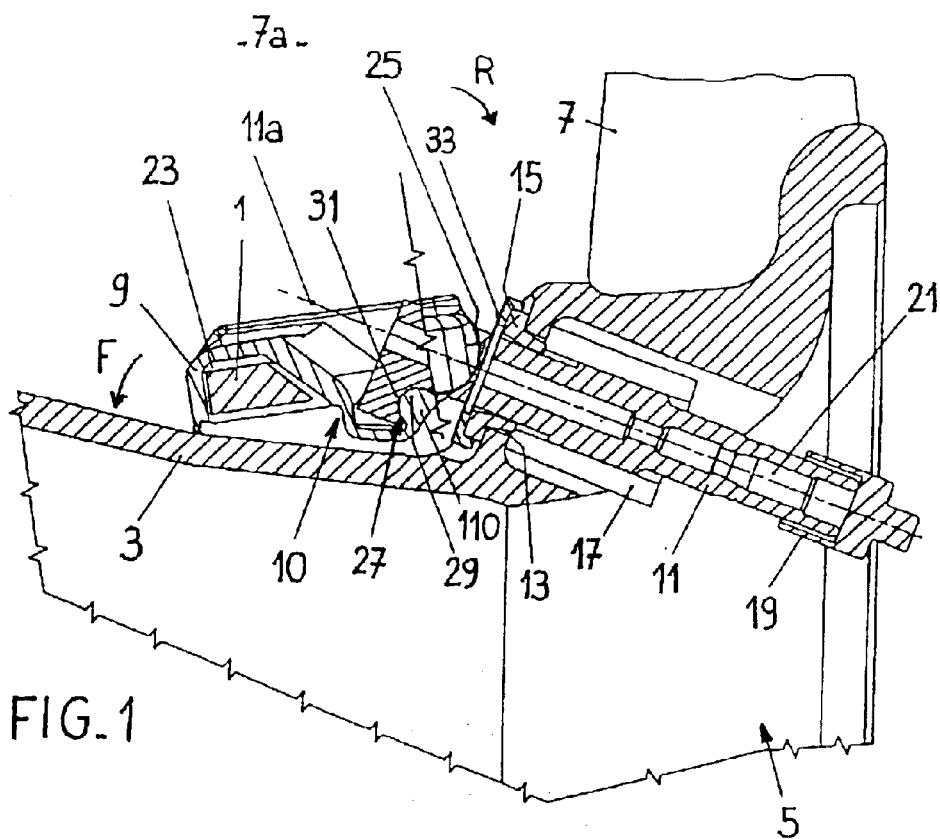

The invention relates to a device for mounting a detector on a wheel rim of an automotive vehicle, and more particularly a device for mounting a tire pressure detector.

The invention also relates to the associated mounting process.

It is known to integrate a tire pressure detector into the wheel rim of an automotive vehicle. The detector is generally integrated with a housing, itself fixed to the (stem of the) valve of the tire. U.S. Pat. No. 6,055,855 is an example of this. Between the valve and the rim, a deformable elastomeric joint, compressed duwasher securement of the valve, assures the air sealing of the device.

Thus there is already known a mounting device comprising:
a housing receiving the detector,
a traction member (which can be the valve stem) having an axis and which is adapted to be mounted on the rim, to pull the housing toward this rim along its axis, the housing being articulated relative to this traction member,
a means for blocking the traction member relative to the rim, once the housing is pulled toward the rim, and
a sealing joint surrounding the traction member where it passes through the rim.

At high speed, the acceleration to which the valve stem is subjected can reach two thousand times the acceleration of gravity. The mass constituted by the housing/detector assembly fixed to the valve stem thus gives rise to a centrifugal force which has the tendency to compress the joint over its external portion and to extend it over its internal portion (on the side of the wheel axle). This pressure unbalance at the location of the joint influences the sealing and can give rise to resulting losses, particularly at high speed.

If, to reduce these losses, the valve stem is further tightened, there is the risk of damaging the joint which is subjected to a too high pressure.

The invention has for its object to provide a more satisfactory solution, by limiting, or even eliminating, the losses of air particularly at high speed. To do this, it is provided that the mentioned device be such that the housing (respectively the joint) has a convex beawasher surface to bear against the joint (respectively the housing) substantially along the axis of the traction member.

It will be understood that in the invention, it is important to be able to press the housing against the profiles of various rims, while ensuwasher rapid mounting, easy to use and reliable.

To do this, a supplemental characteristic of the invention teaches that the housing be adapted to turn (is pivoted) relative to the traction member about an articulation located at a distance from the convex beawasher surface and whose axis is offset relative to that of the traction member.

Again to limit the risk of loss, by avoiding inappropriately stressing the joint, another characteristic of the invention teaches that between the surface of the convex beawasher surface and the joint be interposed a flexible or deformable washer (thereby better to mate with the housing) having surfaces which distribute over an extended surface of the joint the force exerted on this joint by the housing. In the case in which the housing has a flat surface, if there is interposed a washer, it is the washer, and not the joint, which has a convex surface coacting with the flat surface.

Again to control the deformation of the stressed joint, in relation to the mentioned problems of loss, a supplemental characteristic of the invention teaches that the washer have a peripheral skirt (or shoulder) surrounding, at least locally, the periphery of the joint to prevent or limit its crushing transversely to the direction of the bearing force exerted by the housing on the rim. Thus the flow of the joint is restricted beyond the washer by confining it to its sealing function.

In addition to the device which has been set forth, the invention relates to a mounting process for a housing provided with a detector, on a wheel rim of an automotive vehicle.

To overcome in particular the problem of failure of sealing arising unseen in the systems of the prior art, the mounting process of the invention provides that:

a) there is utilized a housing provided to receive the detector, said housing being connected articulatedly to a traction member having an axis, b) the traction member is mounted on the rim through an opening in this rim, c) there is interposed between the housing and the rim a joint substantially at the location where the traction member passes through said rim, d) and one pulls on the housing along said axis, by axial movement of the traction member whose position is blocked by an axial blocking means, after the housing has been drawn toward the rim, with the particularity that during step d), a convex bearing surface coacts with a flat surface to bear on the joint substantially along the axis of the traction member.

To control the deformation of the joint, as indicated above, it is thus moreover taught to interpose a washer with substantially flat (or convex if the housing is convex) bearing surface or surfaces between the joint and the convex (or flat) bearing surface of the housing.

And again to facilitate the sealed mounting of the housing of the detector on the rim, by permitting particularly an adaptation to different types of rim, without the increase of speed acting against the sealing of the mounting, another characteristic of the invention teaches that the swinging couple of the housing relative to the traction member be created at a position located spaced from the axis of the traction member.

Figure 2:
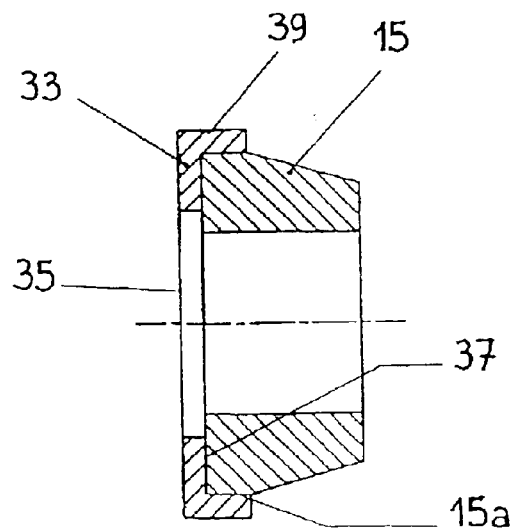
Figure 3:
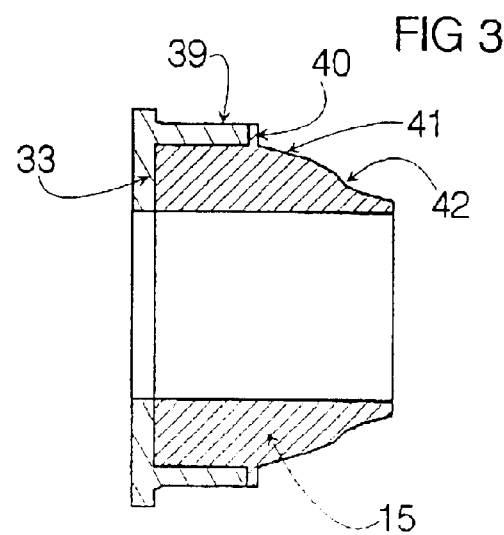

A more detailed description of the invention will now be given with reference to the accompanying drawings, in which:

FIG. 1 shows a possible embodiment of a mounting device according to the invention, FIG. 2 shows in an enlarged view a joint provided with a bearing washer limiting the risk of loss of air in the vicinity of the joint, FIG. 3 is a view corresponding to FIG. 2 showing a modified embodiment of the joint mounted in the bearing washer.

At the outset in FIG. 1, there is seen a mounting device 10 adapted to permit the mounting of a detector 1 (such as an air pressure detector in a tire) on the rim 3 of an automotive vehicle wheel 5.

Reference 7 designates a portion of the tire, and it will be seen that the housing 9 of the device 10 which receives the detector 1 is disposed within the tire.

For mounting on the rim 3, the device 10 comprises, in addition to the housing 9, a traction member 11 (or valve stem) elongated along an axis 11a.

The stem 11 of the valve is mounted through an opening 13 in the rim. A joint 15 mounted about the stem 11 within the interior 7a of the tire, provides sealing in this region.

Typically, the valve stem 11 is screwed on the rim 3, through the joint 15. A nut 17 (disposed on the outer side of the rim, opposite the internal volume 7a of the tire 7) permits gripping the valve stem 11, which is accordingly screw threaded for this purpose.

It will be seen that the valve stem for inflating/deflating the tire and the traction member of the housing receiving the detector, are of a single and same piece. This is not required.

A plug 19 closes the end of the valve stem, to prevent/ limit any escape of air (loss) through the internal conduit 21 of the stem 11 (this conduit is connected to the chamber 7a of the tire) and to limit intrusions of foreign bodies toward the valve shell.

In one region, the housing 9 has a cavity 23 where the pressure detector 1 is disposed.

To ensure good mounting of the detector 1, by avoiding the risk of loss in the region of opening 13, particularly at high speed (130 km/hour and more, in particular), the housing 9 has a convex bearing surface 25 to bear substantially along the axis 11a against the (which is to say in the direction of the) joint 15 by pressing it against the rim, and this the more so as the speed of rotation of the wheel is higher.

Moreover, to promote this axial force tending to press the housing 9 in the direction of said rim, along the axis 11a, this housing is articulated relative to the valve stem 11, in the region of an articulation 27 located spaced from the bearing surface 25.

The convex surface 29 of the articulation is provided in a region of the housing, whilst the head 110 of the traction stem 11 has, facing it, a concave surface 31. This could be the other way around.

Thus, once the traction stem 11 is engaged through the opening 13 and the joint 15, manipulation of the nut 17 permits pulling on the housing 9 which, as a function of the shape of this region of the rim 3, more or less swings about the articulation 27, so as to wedge it against the joint 15, under the traction force of the stem 11, in the direction of the arrow F in FIG. 1.

To avoid a dished deformation of the joint 15 (at least in the case of a deformable joint, such as an elastomeric joint), a bearing member, such as a steel washer 33, is interposed between the joint and the convex bearing surface 25 of the housing. This washer 33 ensures homogeneous distribution of the compressive force created by the convex surface 25 on the joint 15.

To ensure best distribution of the force exerted by the housing on the joint so as to limit losses in the region of the opening 13, the bearing surface 35 of the washer 33 which comes into contact with the housing is preferably substantially flat, and specifically perpendicular to the axis 11a.

The same is true for the opposite surface 37, which comes into contact with the joint 15 (see particularly FIG. 2).

To avoid the joint being crushed radially (substantially perpendicular to the traction axis 11a), the washer 33 for homogeneous distribution of this tractive force can be provided with a peripheral shoulder (or skirt) 39, locally surrounding a peripheral region 15a of the joint 15.

According to a modified embodiment, the joint 15 is overmolded (for example) with the interior of the skirt 39 (FIG. 3). The shape of this joint is made optimum to ensure better sealing between the rim (not shown) and the bearing washer 33. To this end, this joint can have a small collar 40 provided over all its periphery at the end of the skirt 39. This small collar is in contact on the one hand with the section of the skirt 39 of the bearing washer and on the other hand (not shown) with the edge of the opening 13 pierced in the rim. This permits accommodating any lack of: planarity between the rim and the bearing washer.

The small collar 40 is integral with the rest of the joint 15 at the time of overmolding. Because of this, the assembly of the joint adheres perfectly to the bearing washer 33.

Again preferably, the external portion of the joint 15 extending between the small collar 40 and the end of the joint located opposite the washer 33, has a generally beveled form 41 with a jog 42. This shape is more particularly adapted to ensure increased sealing between the valve, the rim and the washer. Moreover, this shape permits decreasing the stresses within the joint at the time of gripping of the washer against the rim. There is thus avoided the appearance of rupture lines within the joint and its lifetime is correspondingly increased. This is to avoid portions of the joint exceeding their elastic limit during gripping of the washer against the rim.

Preferably, the convex bearing surface 25 (FIG. 1) has the tendency to press more strongly against the member 33, the higher the speed of rotation of the wheel.

The mounting device 10 thus has the tendency to space itself from the rim 3 (arrow R) when the wheel is driven in rotation. This is due to the centrifugal acceleration to which the detector is subjected.

Thus, preferably, the higher the speed of rotation of the wheel, the more strongly the joint 15 is applied against the opening 13 of the rim.

The convex bearing surface 25 thus ensures a self-gripping effect on the joint at high speed, becomes its shape is such that the more the housing turns according to the arrow R, the more it bears against the joint. This permits automatically eliminating losses of air at high speed, whilst this was impossible according to the prior art.

As a modification (not shown) the convex bearing surface could be disposed on the joint, in this case the housing has a flat surface adapted to coact with this convex surface to create the self-gripping effect of the joint at high speed.

In the case in which a washer is interposed between the housing provided with its flat surface and the joint, it is this washer (and not the joint) which has a convex surface coacting with the flat surface of the housing. The joint in this case has a flat surface analogous to that shown in FIG. 2.

It will also be noted that the bearing against the washer could be partially effected by the valve itself and not only by its convex portion.

For supplemental details of mounting of the device 10 on the rim 3, reference is made to the description on page 3, lines 25–39 of French patent application FR 0111539 filed Sep. 6, 2001.

What is claimed is:

1. Device for mounting a detector on a wheel rim of an automotive vehicle, comprising:

a housing (10) receiving the detector (1), a traction member (11) having an axis (11a), said member being adapted to be mounted on the rim (3), to pull the housing toward this rim along its axis, the housing being articulated relative to this traction member, means (17) for blocking the traction member relative to the rim once the housing has been drawn toward the rim, and a sealing joint (15) surrounding the traction member in the region where it passes through the rim, characterized in that the housing (10), respectively the joint (15), has a convex bearing surface (25) to bear against the joint (15), respectively the housing, substantially along the axis (11a) of the traction member.

2. Device according to claim 1, characterized in that the housing (1) is adapted to turn relative to the traction member

(11) about an articulation (27) located spaced from the convex bearing surface (25) of the housing and whose axis is offset relative to that of the traction member.

3. Device according to claim 1, characterized in that between the convex bearing surface (25) and the joint (15) is interposed a flexible or deformable washer (33) having surfaces (35, 37) which distribute homogeneously over an extended surface of the joint the force exerted on this joint by the housing.

4. Device according to claim 3, characterized in that the flexible or deformable washer (35) has a peripheral skirt (39) surrounding at least locally the periphery of the joint, to prevent or limit its crushing transversely to the direction of the bearing force exerted by the housing and thus to circumscribe the flow of the joint beyond the washer by confining it to its sealing function.

5. Process for mounting a detector on a wheel rim of an automotive vehicle, according to the following steps:
 a) there is used a housing (10) provided to receive the detector (1), said housing being connected articulatedly to a traction member (11) having an axis,
 b) the traction member is mounted on the rim (3) through an opening (13),
 c) there is interposed between the housing and the rim, about the traction member, a joint (15) substantially at the location at which this traction member passes through said rim, and
 d) one pulls on the housing along said axis (11a), by axial displacement of the traction member whose position is blocked by axial blocking means (17), after which the housing has been pulled toward the rim,
 characterized in that during step (d), the housing is brought toward the rim, substantially along the axis (11a) of the traction member, under the swinging coupling force created by this traction and a convex bearing surface (25) is provided so that the housing will bear, substantially along the axis of said traction member, in the direction of the joint (15) when it is axially pulled toward it.

6. Process according to claim 5, characterized in that there is interposed a washer (33) with substantially flat bearing surface or surfaces (35, 37) between the joint and the convex bearing surface (25) of the housing.

7. Process according to claim 5, characterized in that there is interposed a washer (33) with substantially convex bearing surface or surfaces (35, 37) between the joint and the flat bearing surface (25) of the housing.

8. Process according to claim 5, characterized in that the swinging couple is created at a region located spaced from the axis (11a) of the traction member (11).

9. Device according to claim 2, characterized in that between the convex bearing surface (25) and the joint (15) is interposed a washer (33) having surfaces (35, 37) which distribute homogeneously over an extended surface of the joint the force exerted on this joint by the housing.

10. Device according to claim 9, characterized in that the flexible or deformable washer (35) has a peripheral skirt (39) surrounding at least locally the periphery of the joint, to prevent or limit its crushing transversely to the direction of the bearing force exerted by the housing and thus to circumscribe the flow of the joint beyond the washer by confining it to its sealing function.

11. Process according to claim 6, characterized in that the swinging couple is created at a region located spaced from the axis (11a) of the traction member (11).

12. Device for mounting a detector on a wheel rim of an automotive vehicle, comprising:
 a housing (10) receiving a detector (1);
 a traction member (11) having an axis (11a), said member being adapted to be mounted on a wheel rim (3), to pull the housing toward the rim along the rim's axis, the housing being articulated relative to the traction member;
 blocking means (17) to block the traction member relative to the rim once the housing has been drawn toward the rim; and
 a sealing joint (15) surrounding the traction member in the region where the traction member passes through the rim, wherein,
 the joint (15) has a convex bearing surface (25) bearing against the housing, substantially along the axis (11a) of the traction member.

* * * * *